Patented May 3, 1949

2,469,108

UNITED STATES PATENT OFFICE 2,469,108

WAX-POLYAMIDE-PINENE RESIN COATING COMPOSITION

Karl W. Fries, Rhinelander, Wis., assignor to Rhinelander Paper Company, Rhinelander, Wis., a corporation of Wisconsin No Drawing. Application August 6, 1945, Serial No. 609,333

3 Claims. (Cl. 260—23)

This invention relates to a coating composition and more particularly to a coating composition for application either in the form of an organic solution or in the form of a hot melt, for imparting to sheet material coated therewith heat sealing, moisture vapor resisting, greaseproofing, transparent and glossy properties.

One of the ingredients of my coating composition is a polyamide resin, such as that known in the trade under the name "Norelac," which may be generically described as a polyalkylene polyamide of polymerized higher molecular weight fatty acids. Specifically, "Norelac" is believed to be an ethylene diamine polyamide of dimerized and trimerized linoleic and linolenic acids.

Such a polyamide resin, together with a suitable plasticizer, can be used as a coating composition, but the plasticized polyamide resin alone does not give a satisfactorily moisture vapor resistant coating. For instance, a sample of glassine paper coated with a polyamide resin lacquer, when tested, showed a moisture vapor transmission of about 50 grams per 100 square inches per 24 hours when tested by the Southwick method of determining moisture vapor transmission. In this method, anhydrous calcium chloride is sealed by the sheet under test against an atmosphere of approximately 95% relative humidity and at approximately 100° F.

When, however, paraffin wax is added to a plasticized polyamide resin coating composition, in the proportion of about 5% paraffin wax based upon the plasticized polyamide resin, the moisture vapor transmission rate is reduced to about 4 grams of moisture per 100 square inches per 24 hours. Even this vapor transmission rate, however, is too high for many purposes.

I have found that if in addition to the plasticized polyamide resin and wax, I incorporate into the coating composition a polyisobutene resin, such as that known to the trade under the name "Vistanex," or a terpene resin made by polymerizing beta-pinene in the presence of a catalyst, such as that known to the trade under the name "Piccolyte," and having a melting point of around 115° C. or higher, the moisture vapor transmission rate can be very materially reduced. For instance, glassine paper of 24 pounds basis weight, when coated with three pounds per ream of a mixture of 90% plasticized polyamide resin, 5% paraffin wax and 5% "Piccolyte," by weight, tested about 0.8 to 1.2 grams of moisture vapor per 100 square inches per 24 hours. Similar tests using coating compositions prepared from a plasticized polyamide resin compounded with 3.75% of wax and 1.25% of "Vistanex," and from a plasticized polyamide resin compounded with 7.5% of paraffin wax and 2.5% of "Vistanex" gave moisture vapor transmission rates, respectively, of 1.5 and 0.7 grams of moisture per 100 square inches per 24 hours. These moisture vapor transmission rates are substantially lower than any that I have previously observed by testing glassine paper coated with any heretofore known coating composition.

In addition to the moisture vapor-proofness of coatings produced by my coating composition, such coatings possess heat sealing, greaseproof, and transparent properties that are very desirable. In general, any sheet of web material can be coated with the coating composition of my invention and have imparted thereto the above properties. In particular, my coating composition may be applied to glassine and other greaseproof papers, kraft, sulphite paper and to films or foils of any of the usual plastics, such as nitrocellulose, cellulose acetate, ethyl cellulose, and the like, and to regenerated cellulose. The properties of moisture-proofness, grease-proofness and transparency are, however, realized to the best advantage when the coating composition is applied to paper or other fibrous sheet material not ordinarily possessing any substantial resistance to the penetration of moisture vapor.

In the preparation of lacquers embodying the coating composition of my invention, I have found that in order to obtain a stable solution of the "Vistanex" in the organic solvent, it is necessary to incorporate an effective proportion of a wax, such as paraffin wax. Otherwise "Vistanex" cannot be maintained in stable dispersion in the usual lacquer solvents, such as isopropyl alcohol, toluol, xylol, lactol spirits or other aromatic petroleum fraction, and mixtures of these. Where "Vistanex" is used it is an important feature of my invention to incorporate a sufficient proportion of wax in the lacquer coating composition not only to increase the vapor-proofness of the coating produced therefrom but also to enable "Vistanex" to be incorporated into the lacquer to form a stable solution.

It is therefore an important object of this invention to provide a coating composition, either in the form of solution or in the form of a hot melt, capable when applied to sheet or web material, film or foils, of imparting thereto the valuable properties of moisture-vapor-proofness, heat sealing, grease-proofness, transparency and glossiness of surface.

Other and further important objects of this invention will become apparent from the following description and appended claims.

The major ingredient of my coating composition is a plasticized polyamide resin, which, as previously stated, is a polyalkylene polyamide of a fatty acid, such as the ethylene diamine polyamide of dimerized and trimerized oleic, linoleic and linolenic acids. The source of the linoleic, and linolenic acids used in this specific polyamide resin may suitably be soya bean oil. The melting point of the polyamide resin known as "Norelac" is between 105 and 110° C., as determined by the ball and ring method. The polyamide resin may be plasticized by the use of any suitable plasticizer, such as dibutyl phthalate or a mixture of ortho- and para-toluene ethyl sulfonamides. The proportion of plasticizer is not important so long as the desired degree of plasticity is obtained, but, in general, about 5 to 10% of plasticizer based upon the weight of the polyamide resin has been found most satisfactory.

Since the polyamide resin by itself does not produce a sufficiently moisture vapor resistant coating, a wax, such as paraffin wax, or any other mineral wax, or a vegetable wax, is incorporated into the plasticized polyamide resin composition. Ordinarily, the proportion of wax to the polyamide resin should be between 3 and 10% of wax based upon the weight of the plasticized polyamide resin. Samples of paper coated with a straight plasticized polyamide resin lacquer and with a plasticized polyamide resin-wax lacquer containing 5% of paraffin wax by weght of the plasticized polyamide resin, showed respectively vapor transmission rates of about 50 and 4 grams of moisture per 100 square inches per 24 hours. For some purposes, this latter would be a satisfactory degree of resistance to the passage of moisture vapor.

However, where a high degree of resistance to the passage of moisture vapor, amounting substantially to moisture-vaporproofness, is desired, I incorporate into my coating composition about 10% or less of a terpene-resin such as "Piccolyte," or a polyisobutene resin, such as "Vistanex." Papers coated with a plasticized polyamide resin compounded with 3.75% of paraffin wax and 1.25% of "Vistanex" gave a moisture vapor transmission rate of 1.5 grams per 100 square inches per 24 hours. Large amounts of "Vistanex" in the lacquer formulation give better moisture vapor resistance than smaller amounts, as can be seen from the following comparison:

Grams moisture per 100 sq. inches per 24 hours
Plasticized polyamide resin compounded with 3.75% wax and 1.25% Vistanex_____ 1.515
Plasticized polyamide resin compounded with 7.5% wax and 2.5% Vistanex_____ 0.688

With the addition of wax alone to the polyamide resin, it has thus far been impossible to reduce the moisture vapor transmission rate to less than 4 grams of moisture per 100 square inches per 24 hours. The addition of "Piccolyte" or "Vistanex," therefore, makes possible a very substantial reduction in the moisture vapor transmission rate, such that paper and other sheet or web material coated with my coating composition can be properly termed moisture-vaporproof. In all cases for comparison, the weight of coating was approximately the same, viz. about 3 pounds of the coating composition per ream of paper weighing 24 pounds on an air-dry basis, 24 x 36 inches, 500 sheets to the ream.

In making up my coating composition including "Vistanex," the wax and "Vistanex" are first melted together in a ratio, say, of three parts of wax to one part of "Vistanex," by weight, and the resulting mixture then dissolved in xylol. This solution can be added to the solvent solution of the other ingredients of the lacquer without causing separation.

As solvent for the plasticized polyamide resin and the poly-isobutylene or terpene resins, many of the usual organic solvents may be used, such as isopropyl alcohol, toluol, xylol, aromatic petroleum fractions, and the like. Mixtures of these solvents such as 70% toluol, or xylol, and 30% of isopropyl alcohol, have been found particularly suitable. The percentage of the isopropyl alcohol in the mixture may be varied, in general, between 10 and 40%.

As an example of the range of proportion of the solids content of the lacquer, the following table may be given:

|  | Preferred per cent |
|---|---|
| Poly-isobutene resin, or terpene-resin, 1 to 10% | 5 |
| Wax, 1 to 10% | 5 |
| Plasticized polyamide resin | Balance |

In general, the most satisfactory ratios by weight of the resin, such as a poly-isobutene or a terpene-resin, to wax, such as paraffin wax, are 1 to 3 for the polyisobutene-wax and 1 to 2 for the terpene-resin-wax. As the amount of resin is increased, the amount of wax should be similarly increased. A plasticizer is incorporated into the mixture. Around 10% by weight of the polyamide resin has been found to be a suitable proportion of plasticizer. Any of the known plasticizers may be used, such as dibutyl phthalate, or a plasticizer put out under the trade name "Santicizer #8" (Monsanto Chemical Company) which is a mixture of ortho- and para-toluene ethyl sulfonamides.

The solids content of the lacquer may be varied between wide limits, depending upon the viscosity that is permissible in the particular process chosen for the application of the lacquer to the material to be coated. Preferably, the lacquer solution should have a total solids content between 25 and 30%.

If the material is to be coated on both sides, a web of the material may be advanced into contact with a fountain roll, partly immersed in the lacquer, and a spray of the lacquer applied to the upper side of the web material at the nip between the fountain roll and the upper contact roll, or pressure roll. The coated web material is then passed through a drying chamber, where the solvent is evaporated and may be recovered for re-use. The tunnel type of drying chambers has proved satisfactory for the drying of the lacquer coated web material.

Instead of applying the resinous mixture in the form of a lacquer, it can be applied as a hot melt. In this case, the resins and wax are melted together and the melt applied to the surface of the material by means of rolls, doctors, or the like.

The weight of coating applied to web material, such as paper, may be of the order of 3 pounds per ream, calculated on the basis of sheets of 24 x 36 inches, 500 sheets to the ream. Other weights of coating may, of course, be applied, but the weight indicated seems to give about the maximum moisture-vaporproofness for any practical weight of coating.

Where the paper or like web or sheet material is to be printed, it is preferable to print the paper first and then apply the lacquer or hot melt coating over the printed surface. The usual printing inks do not adhere well to the coated surface. Since the coating is entirely transparent, the printed matter shows clearly through the coating without loss of intensity or definitness.

Paper coated with the coating composition of my invention has the very desirable properties of being heat sealing, substantially proof against the penetration of moisture-vapor and greases, oils or fats, and is highly glossy. When the paper used in a greaseproof paper, such as glassine, the coated product is substantially transparent.

While waxes are known to reduce the rate of moisture vapor transmission through paper and other web material coated with compositions containing waxes, the incorporation of a poly-isobutene resin or a terpene-resin materially reduces the rate of vapor transmission that is possible through the use of wax alone. In view of the fact that resins of the polyisobutene type of higher molecular weight form unstable solutions when dissolved in the usual lacquer solvents, my discovery that a stable solution could be obtained by first compounding the wax and poly-isobutene in a molten mixture was quite surprising. Furthermore, by maintaining a proper ratio of xylol, or other organic solvent, to isopropyl alcohol, say, within the range of 10 to 40% of isopropyl alcohol by weight of the mixed solvent, I have discovered that a stable dispersion of the solid ingredients of my composition may be obtained.

Among the waxes found suitable may be mentioned paraffin wax, microcrystalline wax, candelilla wax, ozokerite, and other known waxes.

The usual concentration of total solids in the lacquer as used upon the coating machine is between 25 and 30% total solids by weight of the lacquer composition.

It will, of course, be understood that various details of the process may be varied through a wide range without departing from the principles of this invention, and it is, therefore, not the purpose to limit the patent granted hereon otherwise than necessitated by the scope of the appended claims.

I claim as my invention:

1. A coating composition comprising in solution in an organic solvent a mixture of from 1% to 10% of a polymerized beta-pinene resin having a melting point of around 115° C., from 1% to 10% wax, the balance consisting of a plasticized ethylene diamine polyamide of dimerized and trimerized linoleic and linolenic acids.

2. A lacquer composition adapted for use as a moistureproofing coating comprising in solution in an organic solvent a mixture of from 1% to 10% polymerized beta-pinene resin having a melting point around 115° C., from 1% to 10% wax, the balance consisting of a plasticized ethylene diamine polyamide of dimerized and trimerized linoleic and linolenic acids, said lacquer composition containing between 25 and 30% solids.

3. A lacquer composition adapted for use as a moistureproofing coating composition comprising in solution in an organic solvent a mixture of from 1% to 10% of a polymerized beta-pinene resin having a melting point of around 115° C., from 1 to 10% wax, the balance consisting of a plasticized ethylene diamine polyamide of dimerized and trimerized linoleic and linolenic acids, said polyamide being plasticized by the addition of 5 to 10% by weight of said polyamide of a plasticizing material, said lacquer composition containing between 25% and 30% solids.

KARL W. FRIES.

REFERENCES CITED

The following references are of record in the file of this patent:

UNITED STATES PATENTS

| Number | Name | Date |
| --- | --- | --- |
| 2,147,629 | Charch | Feb. 21, 1939 |
| 2,194,958 | Szegvari et al. | Mar. 26, 1940 |
| 2,354,574 | Carson | July 25, 1944 |
| 2,249,686 | Dykstra | July 15, 1941 |
| 2,402,123 | Burgess et al. | June 18, 1946 |

OTHER REFERENCES

Cowan et al.: "Oil and Soap," April 1944, pp. 101–107.

Slotterbeck et al.: "Official Digest," November 1944, pp. 511–513.

Howey: "Modern Plastics," May 1945, pp. 125, 126 and 192.